Figure 1:
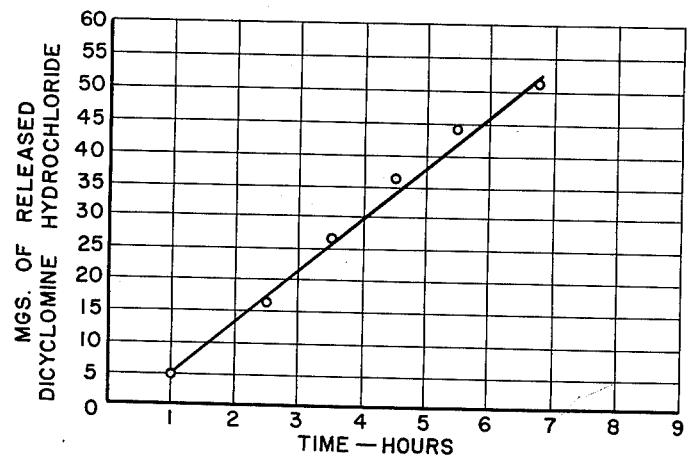
Figure 2:
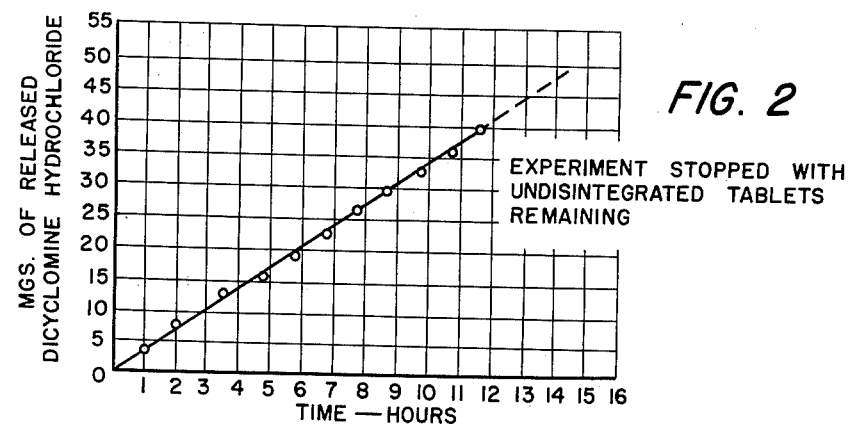
Figure 3:
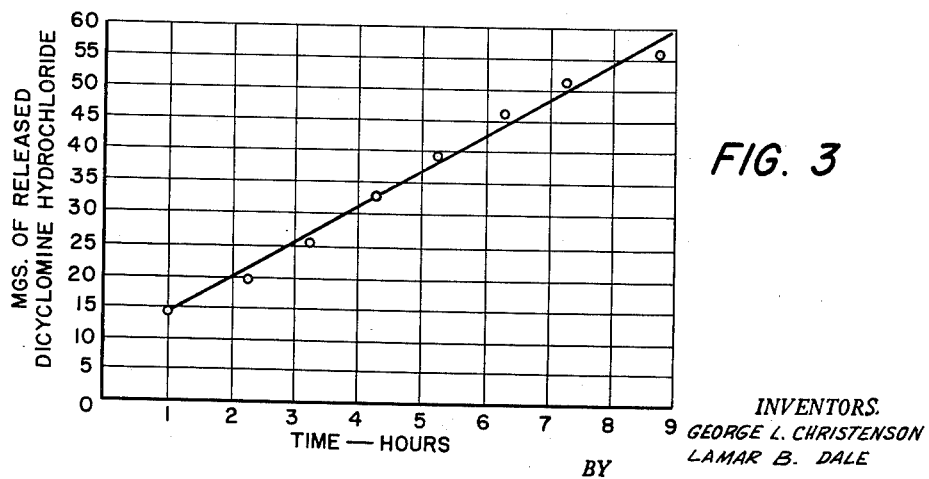
Figure 4:
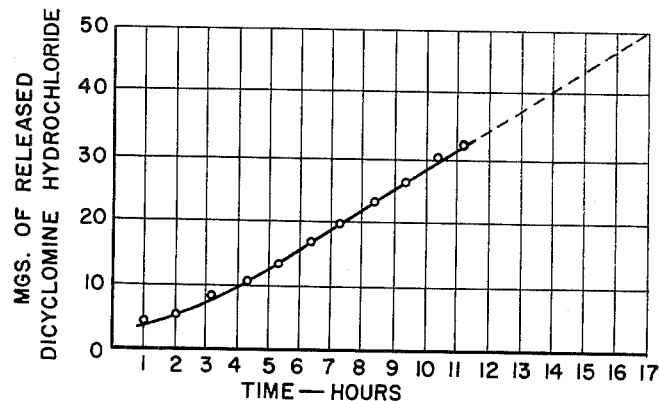
Figure 5:
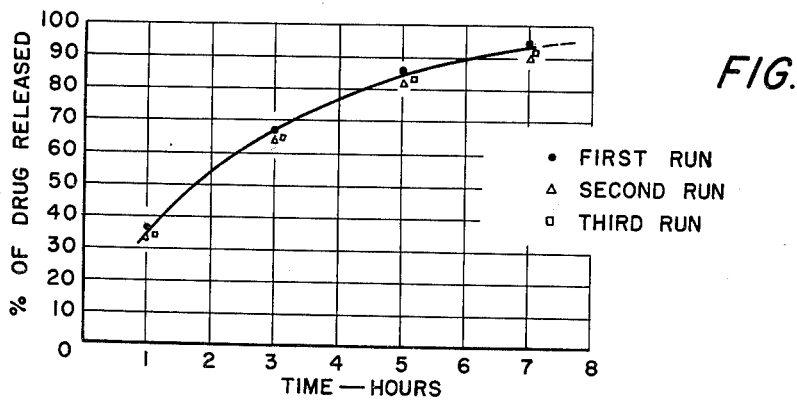
Figure 6:
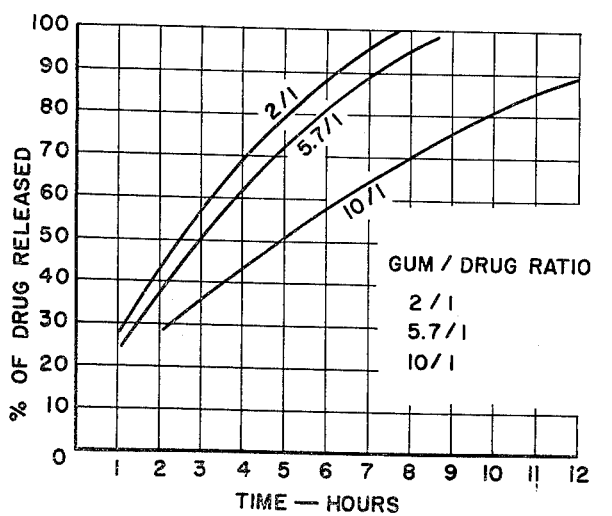

Nov. 20, 1962   G. L. CHRISTENSON ETAL   3,065,143
SUSTAINED RELEASE TABLET
Filed April 19, 1960   2 Sheets-Sheet 1

INVENTORS.
GEORGE L. CHRISTENSON
LAMAR B. DALE
BY
ATTORNEY

- FIRST RUN
- △ SECOND RUN
- □ THIRD RUN

| GUM/DRUG RATIO | TABLET WEIGHT |
|---|---|
| 2/1 | 180 mg. |
| 5.7/1 | 272 mg. |
| 10/1 | 450 mg. |

INVENTORS.
GEORGE L. CHRISTENSON
BY LAMAR B. DALE

ATTORNEY 3,065,143
Patented Nov. 20, 1962

3,065,143
SUSTAINED RELEASE TABLET
George L. Christenson and Lamar B. Dale, Cincinnati, Ohio, assignors to Richardson-Merrell Inc., a corporation of Delaware
Filed Apr. 19, 1960, Ser. No. 23,240
7 Claims. (Cl. 167—82)

This invention relates to new dosage units of medicinal agents for oral administration in the form of tablets which provide a substantially constant rate of release of the medicament in the gastro-intestinal tract. More particularly, the invention relates to compressed tablets containing a medicinal agent and a hydrophilic gum which hydrates rapidly and swells in aqueous fluids at body temperature.

The present application is a continuation-in-part of our copending application Serial No. 667,620, filed June 24, 1957, and a continuation-in-part of our application Serial No. 690,418, filed October 16, 1957, both now abandoned.

The importance of providing dosage unit forms of medicinal agents for oral administration which release the drug slowly and at a uniform rate has become more apparent as new drugs are made available. When the medicament is released too quickly, the stomach may become upset and the acid environment may have an adverse effect upon the drug. Sometimes the rapid absorption of large amounts of potent drugs results in unnecessarily high blood levels of the drug which may result in unpleasant or even toxic manifestations. Rapid release of the drug is also generally wasteful in that it is often absorbed and excreted through the kidneys in a short time, and consequently an effective blood level of the drug in the circulatory system is not maintained.

As one example of the need for a dosage unit form which releases the drug at a relatively constant rate over a long period of time reference may be had to the treatment of hypercholesteremia with nicotinic acid. When nicotinic acid is used in the treatment of atherosclerosis, relatively large amounts of nicotinic acid are given orally. Unpleasant side effects such as peripheral vasodilation (blushing), pruritis, urticaria, dryness of the skin, blurring of vision and other undesirable reactions occur as a result of the large dosage. Antihistamines, when taken in large doses often give rise to nausea and drowsiness. Single doses of anorexic agents taken to depress the appetite do not have the desired effect more than a few hours. Large doses also tend to have an effect on the central nervous system. These undesirable side effects can be avoided and the effect of the drug maintained if the administration of the drug is at a slower rate over a longer period of time.

The present invention provides a dosage unit form for the administration of medicaments which releases the medicament at a relatively uniform rate over a long period of time. The dosage unit forms of the present invention not only avoid the above mentioned difficulties, but provide various advantages in addition thereto. For instance, the equivalent of two or three normal doses of a drug may be incorporated in one tablet of the present invention which may be taken only once every eight to twelve hours. This makes it possible to maintain the action of the drug during the night while the patient is asleep as well as during the day when it may be inconvenient to take frequent doses of medication.

The present invention is based upon the discovery that when a drug, whether it be water soluble or water insoluble, is mixed with a hydrophilic mucilaginous gum which hydrates readily and swells in water at body temperature is pressed into a tablet, the resulting tablet will not immediately dissolve or disintergate on contact with the gastric fluids if the proportion of the hydratable gum in the tablet is sufficiently large. The gums contained in the tablets prepared in accordance with the present invention are those which hydrate and swell in contact with aqueous fluids at body temperature. In swelling, a relatively water impermeable barrier is formed at the surface of the tablet which prevents further entry of water into the interior of the tablet. The soft mucilaginous gum gel barrier formed on the surface of the tablet is worn away by the motion of the tablet in the gastro-intestinal tract, and some of the admixed medicinal agent is carried away with it and released. The fresh surface of the tablet that is exposed as the soft hydrated gum wears away becomes hydrated and swells thus renewing the protective coating. As a result the tablet is slowly disintegrated rather than dissolved and the medicament contained therein is released at a substantially uniform rate.

When the amount of hydrophilic gum is below a certain critical level, water penetrates into the interior of the tablet, causes the gum in the interior of the tablet to swell and break the tablet apart thus releasing the medicament at a very rapid rate. Also, when the gum is of a type which does not readily hydrate and swell at body temperature, it presents no quickly formed barrier to the aqueous fluids in the intestinal tract which readily penetrate the tablet and either break it up or leach out water soluble components. As will be seen, therefore, it is an essential part of the invention that hydrophilic gums that hydrate and swell rapidly at about 37° C. be used.

*Example 1*

To illustrate the action of the water swellable gums as used in the present invention, a series of tablets were prepared in which nicotinic acid was used as the medicinal agent and Methocel 60 H. G. 4,000 cps. (a proprietary hydroxypropyl methyl cellulose ether) was used as the gum. In preparing these tablets 100 grams of nicotinic acid and 1.1 grams of magnesium stearate (a mold lubricant) were passed through a 20 mesh screen and then mixed with 10 grams of hydroxypropyl methyl cellulose ether. Tablets weighing 110 mg. each were prepared by compressing the mixture on a 3/8 inch standard punch. Similar tablets were prepared using however, regular grade 400 cps. methyl cellulose as the gum. Tablets containing ratios of two parts of the drug to one part of the gum up to one part of the drug to sixteen parts of gum were similarly prepared.

The disintegration time of these tablets were determined by the U.S.P method using the Stoll-Gershberg apparatus. Six tablets were placed in the basket of the apparatus, and the basket was lowered into an 800 ml. beaker containing 600 ml. simulated gastric fluid maintained at 37° C. The apparatus was then operated in the prescribed manner. At the end of one hour the basket was removed and transferred to a beaker containing 600 ml. of simulated intestinal fluid. The apparatus was again operated until the tablets had disintegrated. The total disintegration times were recorded and are as follows:

|  | Disintegration Time (minutes)—Drug/Gum Ratio | | | | |
|---|---|---|---|---|---|
|  | 10/1 | 2/1 | 1/1 | 1/4 | 1/16 |
| Drug—Nicotinic Acid<br>Gum—Methyl Cellulose | 9 | 35 | 60 | 60 | 85 |
| Drug—Nicotinic Acid<br>Gum—Hydroxy Propyl Methyl Cellulose Ether | 105 | 250 | 450 | 570 | 650 |

In order that a dosage unit form of medication be useful because of its prolonged action, it should continue to release medication in the gastro-intestinal tract for at least three to four hours after ingestion. As will be seen from the above table, tablets prepared with methyl cellulose failed to provide sustained release of the drug over a useful period of time. Even small amounts of the hydroxypropyl methyl cellulose ether were insufficient. Accordingly, we prefer that the tablets of the present invention contain at least one part by weight of the hydrophilic, water swellable gum for each two parts of the other components of the tablet whether they be active ingredients or conventional fillers, binders or excipients.

*Example 2*

To illustrate the uniform manner in which drugs are released from tablets prepared in accordance with the present invention, a number of tablets of dicyclomine hydrochloride were prepared with sodium carboxy methyl cellulose. The rate of release of the drug in tablets containing 50 mg. of dicyclomine hydrochloride and 450 mg. of extra high viscosity sodium carboxy methyl cellulose is shown in FIGURE I. The rate of disintegration was determined by the standard U.S.P. method at 37° C. using deionized water as the disintegrating fluid. As will be seen from the drawing, the drug was released over a period of about seven hours at a substantially linear rate.

Tablets containing 50 mg. of dicyclomine hydrochloride and 450 mg. of carboxy polymethylene were prepared and subjected to disintegration tests as described above. The results are shown in FIGURE II. As will be seen, these tablets also disintegrated at a substantially linear rate, the drug being released slowly over a period in excess of twelve hours.

*Example 3*

Tablets similar to those described above in connection with FIGURE I were prepared and subjected to further disintegration tests. They were first placed in contact with artificial gastric juice for one hour in the standard U.S.P. disintegrator at 37° C. and then subjected to artificial intestinal fluid for the remainder of the test period, also at 37° C. The results of this test are shown in FIGURE III. Similarly, tablets prepared with carboxy polymethylene as illustrated in FIGURE II were subjected to disintegration tests for one hour at 37° C. in artificial gastric juice and then in artificial intestinal fluid with results shown in FIGURE IV. A comparison of FIGURES III and IV with FIGURES I and II shows that the linear release effect is not significantly influenced by changes in solution, acidity or alkalinity. Rather, it appears to be a hydration phenomenon. This fact is important since individuals exhibit significant variations in gastro-intestinal conditions and a composition which relies on disintegration by changes in pH or by enzymatic digestion would be expected to behave differently from individual to individual. However, tablets which rely on a hydration effect aren't as apt to behave differently among individuals, since water, especially in the upper gastro-intestinal tract, is generally in constant excess.

*Example 4*

Tablets containing nicotinic acid as the therapeutic agent were prepared using a mixture of hydrophilic gums as follows. Sixteen grams of carboxy polymethylene were mixed with 40 grams of sodium carboxy methyl cellulose, extra high viscosity, and passed through a 20 mesh screen. To this mixture was added 180 grams of hydroxy propyl methyl cellulose ether, sold under the name Methocel 90 H.G. 4,000 cps., and 500 grams nicotinic acid U.S.P. The materials were mixed well and granulated with 400 ml. of a sixteen percent gelatin solution and 360 ml. of isopropanol. The granulation was dried in an oven overnight at 120° F. and ground through a Fitzpatrick mill, knives forward, using No. 2B screen. To the granulation was then added sixteen grams of stearic acid and 22 grams of aluminum hydroxide, dried gel. The powder was then compressed into 840 mg. tablets on a one-half inch standard cup punch.

The above described tablets were then subjected to disintegration tests at 37° C. in the U.S.P. disintegrator as described above. During the first hour the tablets were subjected to the action of artificial gastric fluid, and thereafter subjected to the action of artificial intestinal fluid. The release of the drug into the liquid was at a substantially linear rate over a period of eight hours, over 90% of the drug being released in that time.

*Example 5*

The following were mixed and micropulverized:

| | Gm. |
|---|---|
| Diethyl propion | 75 |
| Tartaric acid | 30 |
| Methocel 90 H.G.—15,000 cps | 205 |
| Mannitol, powd | 100 |
| F.D. and C. Yellow—Lake No. 5 | 0.875 |

The mixture was then granulated with five percent starch paste and dried in an oven at 120° F. The granulation was micropulverized through a coarse screen, lubricated with one percent zinc stearate and pressed into 411 mg. tablets on a three-eighths inch flat face bevel punch.

The above described tablets were then subjected to disintegration tests in the U.S.P. disintegrator at 37.5° C. During the first hour the tablets were subjected to the action of artificial gastric fluid, after which they were subjected to artificial intestinal fluid. These disintegration tests were repeated with three different groups of tablets to determine the reproducibility of the rate of release of the drug. The results of these tests are shown in FIGURE V. As will be noted, over 90 percent of the drug was released in a period of seven hours wtih a high degree of reproducibility.

*Example 6*

The following antihistamines were screened through a 20 mesh screen and mixed with the carboxy methyl cellulose.

| | Gm. |
|---|---|
| Doxylamine succinate | 20 |
| Pyrilamine maleate | 20 |
| Pheniramine maleate | 20 |
| Sodium carboxymethylcellulose, extra high viscosity | 600 |

The dry mixture was compressed into tablets weighing 660 mg. on a 7/16 inch standard cup punch. The rate of disintegration of these tables was determined as above, first in artificial gastric fluid, and then in artificial intestinal fluid at 37° C. Aliquots of the fluid were taken at the end of one hour and at two hour intervals thereafter until the tablets were disintegrated. The results when plotted indicate a relatively sharp rise in concentration of the drug during the first hour followed by a linear, even rate of release for seven more hours, at which time substantially all of the antihistamine activity had been released. The twelve tablets which had been placed in the basket of the disintegrator totally disintegrated within a period of thirty minutes of each other.

The above described antihistamine tablets were also tested in vivo using the method described by Green, Ann. Allergy, 12:273—283 (May-June) 1954. Ten subjects received an intradermal injection in the forearm of 0.1 cc. of a 1:10,000 aqueous solution of histamine diphosphate. The diameter of the resultant wheal was measured ten to fifteen minutes later. Each of four subjects received one of the antihistamine tablets described above, two subjects received one commercially available extended time release-tablet, two subjects received another commercially available slow release antihistamine capsule and two subjects served as controls. At two hour intervals over a course of fourteen hours, the injections were repeated as before.

The results of the in vivo tests showed that reduction in the size of the wheal was greater and more prolonged following administration of the tablets prepared in accordance with the present invention than it was after administration of the other antihistamine preparations. The duration of the effect in vivo was twelve to fourteen hours in those patients receiving the tablets of the present invention. The uniformity of drug effect is attributable to linearity of drug release from the tablets.

*Example 7*

Tablets of dicyclomine hydrochloride were prepared using hydroxypropyl methyl cellulose ether sold under the trade name Methocel 60 H.G. 4000 cps. The tablets were prepared with varying ratios of gum to drug of 2:1, 5.7:1 and 10:1 as follows:

(a)

Gum/drug ratio 2:1.  
1000 tablets. Gm.  
Methocel 60 H.G.—4000 cps_____ 120  
Dicyclomine hydrochloride_____ 60

Mix well and compress on 5/16 inch standard cup punch at 180 mg. per tablet.

(b)

Gum/drug ratio 5.7:1.  
1000 tablets. Gm.  
Methocel 60 H.G.—4000 cps_____ 232  
Dicyclomine hydrochloride_____ 40

Mix well and compress at 272 mg. on 3/8 inch standard cup punch.

(c)

Gum/drug ratio 10:1.  
1000 tablets. Gm.  
Methocel 60 H.G.—4000 cps_____ 410  
Dicyclomine hydrochloride_____ 40

Mix well and compress on 3/8 inch standard cup punch at 450 mg. per tablet.

These tablets were then subjected to disintegration tests at 37° C. with the results shown in FIGURE VI. As will be seen, the rate of disintegration can also be controlled by varying the proportion of the hydrophilic gum, higher proportions of gum resulting in slower rates of release of the drug.

Other examples of tablets prepared in accordance with the present invention will now be given. The disintegration of these tablets was measured at 37° C.±1°.

*Example 8*

50 mg. of dicyclomine hydrochloride are mixed with 250 mg. carboxymethylcellulose (extra high viscosity) and compressed on a 7/16 inch, standard cup punch at a net weight of 0.3 gm./tablet. In water or artificial intestinal fluid, this tablet releases dicyclomine hydrochloride at the rate of 11 to 13 weight percent (5.5 to 6.5 mg.) per hour.

*Example 9*

50 mg. dicyclomine hydrochloride are mixed with 800 mg. carboxymethylcellulose (extra high viscosity) and compressed on a 23/32 inch, deep cut punch at a net weight of 0.85 gm./tablet. In water or artificial intestinal fluid, this tablet releases dicyclomine hydrochloride at the rate of 7 to 8 weight percent (3.5 to 4 mg.) per hour.

*Example 10*

50 mg. dicyclomine hydrochloride are mixed with 300 mg. carboxymethylcellulose (medium viscosity) and compressed on a 7/16 inch, standard cup punch at a net weight of 0.350 gm./tablet. In water or artificial intestinal fluid, this tablet releases dicyclomine hydrochloride at the rate of 14 to 16 weight percent (7 to 8 mg.) per hour.

*Example 11*

50 mg. dicyclomine hydrochloride are mixed with 800 mg. carboxymethylcellulose (medium viscosity) and compressed on a 23/32 inch, deep cup punch at a net weight of 0.85 gm./tablet. In water or artificial intestinal fluid, this tablet releases dicyclomine hydrochloride at the rate of 8.5 to 9.5 weight percent (4.25 to 4.75 mg.) per hour.

*Example 12*

50 mg. dicyclomine hydrochloride are mixed with 450 mg. of carboxy polymethylene and the mixture is lubricated with 2 percent by weight of magnesium stearate. The mixture is slugged once on a ½ inch punch and ground through a 10 mesh screen. The resulting mixture is then compressed on a 7/16 inch, standard cup punch at a net weight of 0.5 gm./tablet. In water or artificial intestinal fluid, this tablet releases dicyclomine hydrochloride at the rate of 4 to 7 weight percent (2 to 3.5 mg.) per hour.

*Example 13*

50 mg. dicyclomine hydrochloride are mixed with 200 mg. of carboxy polymethylene and the mixture is lubricated with 2 percent by weight of magnesium stearate. The mixture is slugged once on a ½ inch punch and ground through a 10 mesh screen. The resulting mixture is then compressed on a 5/16 inch, standard cup punch at a net weight of 0.250 mg./tablet. In water or artificial intestinal fluid, this tablet releases dicyclomine hydrochloride at the rate of 6.5 to 11.5 weight percent (3.5 to 5.5 mg.) per hour.

*Example 14*

50 mg. dicyclomine hydrochloride are mixed with 250 mg. of Pharmagel A (a proprietary acid precipitated gelatin) and 250 mg. of carboxy polymethylene and the mixture is lubricated with 1 percent by weight of magnesium stearate. The mixture is then compressed on a 7/16 inch, standard cup punch at a net weight of 0.550 gm./tablet. In water or artificial intestinal fluid, this tablet releases dicyclomine hydrochloride at the rate of 8 to 10 weight percent (4 to 5 mg.) per hour.

*Example 15*

50 mg. dicyclomine hydrochloride are mixed with 125 mg. of Pharmagel A (a proprietary acid precipitated gelatin) and 125 mg. of carboxy polymethylene and the mixture is lubricated with 1 percent by weight of magnesium stearate. The mixture is then compressed on a 5/16 inch, standard cup punch at a net weight of 0.3 gm./tablet. In water or artificial intestinal fluid, this tablet releases dicyclomine hydrochloride at the rate of 16 to 20 weight percent (8 to 10 mg.) per hour.

As stated above, any hydrophilic gum which hydrates rapidly and swells in water at body temperature may be used in amounts from about one part by weight or more of gum to two parts by weight of other components of the tablet may be used in preparing tablets in accordance with the present invention to obtain tablets which release the drugs contained therein at a relatively uniform rate over a period of time in excess of three or four hours. There are a number of naturally occurring and synthetically produced hydrophilic gums which possess these properties. We prefer to use the synthetic materials, however, inasmuch as they are of a more uniform quality, their purity is generally higher and their physical characteristics may be more readily controlled, or chosen. In addition to the gums specifically described in the examples, we may use other synthetic products such as, for instance, hydroxy ethyl cellulose, when highly substituted with hydroxy groups, and, therefore, hydrophilic and water swellable at 37° C. Natural gums, such as sodium alginate, gum karaya, pectin, polygalacturonic acid, sodium polypectate and the like may be also used when they possess the properties described herein.

As will be apparent from the foregoing data the maximum amount of gum is not critical, except insofar as that as the proportion of gum increases the rate of disintegration of the tablet likewise increases so that when amounts of gum such as 20 parts for each part of the drum are used, the rate of release may be too prolonged for practical value.

Also as indicated above, the nature of the drug is immaterial. It may be highly potent or relatively mild. The amount of the drug contained in the tablet will, of course, be determined by the nature of the drug and the expected time over which it would be released in the body. Likewise, the drug may be water soluble or water insoluble, since its regular release is independent upon these factors. The amount of gum to be used in preparing the tablets is determined by the total non-swellable components of the tablets. Substances having no medicinal value, but which do not swell in water, are released along with the drug and, accordingly, the amount of the gum should be at least one-third of the total weight of the tablet for most satisfactory results.

We claim:

1. A compressed tablet for oral administration which is characterized by its ability to resist spontaneous disintegration and to release medicament at a substantially uniform rate over a period of at least four hours in the gastro-intestinal tract which tablet consists essentially of a compressed mixture of an effective amount of a medicament and at least one-third part by weight of the weight of the tablet of a pharmaceutically acceptable hydrophilic gum which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the medicament contained therein when taken orally, but allows slow disintegration of the tablet and release of medicament over a period of at least four hours.

2. A compressed tablet for oral administration which is characterized by its ability to resist spontaneous disintegration and to release medicament at a substantially uniform rate over a period of at least four hours in the gastro-intestinal tract which tablet consists essentially of a compressed mixture of an effective amount of a medicament and at least one-third part by weight of the weight of the tablet of sodium carboxymethyl cellulose which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the medicament contained therein when taken orally, but allows slow disintegration of the tablet in the gastro-intestinal tract and release of medicament over a period of at least four hours.

3. A compressed tablet for oral administration which is characterized by its ability to resist spontaneous disintegration and to release medicament at a substantially uniform rate over a period of at least four hours in the gastro-intestinal tract which tablet consists essentially of a compressed mixture of an effective amount of a medicament and at least one-third part by weight of the weight of the tablet of carboxypolymethylene which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the medicament contained therein when taken orally, but allows slow disintegration of the tablet in the gastro-intestinal tract and release of medicament over a period of at least four hours.

4. A compressed table for oral administration which is characterized by its ability to resist spontaneous disintegration and to release medicament at a substantially uniform rate over a period of at least four hours in the gastro-intestinal tract which tablet consists essentially of a compressed mixture of an effective amount of a medicament and at least one-third part by weight of the weight of the tablet of hydroxypropylmethyl cellulose ether which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the medicament contained therein when taken orally, but allows slow disintegration of the tablet in the gastro-intestinal tract and release of medicament over a period of at least four hours.

5. A compressed tablet for oral administration which is characterized by its ability to resist spontaneous disintegration and to release medicament at a substantially uniform rate over a period of at least four hours in the gastro-intestinal tract which tablet consists essentially of a compressed mixture of at least 100 mgs. of nicotinic acid and at least one-third part by weight of the tablet of a pharmaceutically acceptable hydrophilic gum which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the nicotinic acid contained therein when taken orally, but allows slow disintegration of the tablet in the gastro-intestinal tract and release of nicotinic acid over a period of at least four hours.

6. A compressed tablet for oral administration which is characterized by its ability to resist spontaneous disintegration and to release medicament at a substantially uniform rate over a period of at least four hours in the gastro-intestinal tract which tablet consists essentially of a compressed mixture of an effective amount of diethylpropion and at least one-third part by weight of the weight of the tablet of a pharmaceutically acceptable hydrophilic gum which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the diethylpropion contained therein when taken orally, but allows slow disintegration of the tablet in the gastro-intestinal tract and release of diethylpropion over a period of at least four hours.

7. A compressed tablet for oral administration which is characterized by its ability to resist spontaneous disintegration and to release medicament at a substantially uniform rate over a period of at least four hours in the gastro-intestinal tract which tablet consists essentially of a compressed mixture of an effective amount of an antihistamine and at least one-third part by weight of the weight of the tablet of a pharmaceutically acceptable hydrophilic gum which rapidly absorbs water and swells at 37° C. to form a soft mucilaginous gel barrier on the surface of the tablet when brought into contact with the aqueous fluids of the gastro-intestinal tract which prevents rapid disintegration of the tablet and release of the antihistamine contained therein when taken orally, but allows slow disintegration of the tablet in the gastro-intestinal tract and release of the antihistamine over a period of at least four hours.

References Cited in the file of this patent

UNITED STATES PATENTS

| | | |
|---|---|---|
| 2,540,979 | Clymer et al. | Feb. 6, 1951 |
| 2,749,274 | Buckwalter | June 5, 1956 |
| 2,798,837 | Sahyun | July 9, 1957 |
| 2,798,838 | Robinson | July 9, 1957 |
| 2,805,977 | Robinson et al. | Sept. 10, 1957 |
| 2,851,453 | Kennon et al. | Sept. 9, 1958 |
| 2,887,436 | Klioze et al. | May 19, 1959 |
| 2,957,804 | Shuyler | Oct. 25, 1960 |

OTHER REFERENCES

J. Am. Pharm. Assoc., 38, 59 (1949).

"Carbopol 934," Drug and Cosmetic Industry, vol. 77, No. 6, December 1955.